United States Patent [19]
Bowman

[11] Patent Number: 5,449,456
[45] Date of Patent: Sep. 12, 1995

[54] REJECT WATER DRAIN LINE INSTALLATION SYSTEM AND APPARATUS FOR UNDER SINK REVERSE OSMOSIS FILTER SYSTEM

[76] Inventor: Dennis E. Bowman, 2637 Whitewood, Ann Arbor, Mich. 48104

[21] Appl. No.: 206,850

[22] Filed: Mar. 7, 1994

[51] Int. Cl.⁶ ..................... B01D 27/08; B01D 27/10
[52] U.S. Cl. ................... 210/232; 210/418; 210/460; 285/156; 285/180; 137/216
[58] Field of Search ............ 4/629, 679, 680, DIG. 7; 285/156, 180; 137/216, 216.1; 210/153, 172, 248, 251, 321.6, 460, 500.21, 232, 418; 138/37, 89, 109, 120, 155, 177

[56] References Cited

U.S. PATENT DOCUMENTS

| | | |
|---|---|---|
| 2,122,051 | 6/1938 | Baird . |
| 2,302,617 | 11/1942 | Little . |
| 3,346,887 | 10/1967 | Sommer . |
| 3,620,241 | 11/1971 | Brown . |
| 4,145,768 | 3/1979 | Chevrette . |
| 4,221,406 | 9/1980 | Traylor . |
| 4,250,920 | 2/1981 | Traylor . |
| 4,454,891 | 6/1984 | Dreibelbis et al. . |
| 4,771,485 | 9/1988 | Traylor . |
| 4,856,121 | 8/1989 | Traylor . |
| 4,882,061 | 11/1989 | Petrucci et al. . |
| 4,930,816 | 6/1990 | Biing-Yih ..................... 285/156 |
| 4,998,754 | 3/1991 | Matsumoto et al. . |
| 5,104,150 | 4/1992 | Bard et al. . |
| 5,119,860 | 6/1992 | Slovak et al. . |
| 5,132,017 | 7/1992 | Birdsong et al. . |
| 5,143,601 | 9/1992 | Slovak et al. . |
| 5,152,321 | 10/1992 | Drager et al. . |
| 5,176,165 | 1/1993 | Traylor . |
| 5,351,996 | 10/1994 | Martin ........................ 285/179 |

OTHER PUBLICATIONS

Water Factory Systems–Series N4000, N4500, N5000 (98-880019 Rev. A) Dearborn Brass-Effective Jul. 1, 1992 (Cover/Back and pp. 7, 8, 10, 11, 12).
Brass Craft–(pp. E-1, E-2, E-3, E-4, E-5).

*Primary Examiner*—Robert A. Dawson
*Assistant Examiner*—W. L. Walker
*Attorney, Agent, or Firm*—Barnes, Kisselle, Raisch, Choate, Whittemore & Hulbert

[57] ABSTRACT

A household under-counter reverse osmosis (R/O) water filtration installation wherein the R/O reject waste water under-counter drain line is coupled into a sink drain trap in parallel drainage relation with a garbage disposer sink by a baffle Tee plumbing fitting having first and second normally open inlets perpendicular to one another. The garbage disposer outlet is coupled by a standard slip fit single inlet/outlet fitting to the baffle Tee first inlet. The baffle tee has a single outlet slip coupled to the inlet of the trap. An R/O drain adapter elbow of the invention has its inlet connected to the waste water drain line tube and its outlet coupled to the Tee second inlet. The adapter provides an end closure structure which, with the elbow, sealably closes the second inlet of the Tee. In one form the adapter end closure structure is directly attached to the baffle Tee second inlet and comprises a circular wall with a through-opening including the elbow outlet, a standard ring seal or washer seated on the baffle Tee second inlet and a slip joint nut threadably received on the baffle Tee second inlet and clamping the closure wall periphery and washer sealably together. In another form a series of S/J standard plumbing fittings may connect a non-disposer sink drain outlet of a single sink installation directly to the trap. A three-way Tee has its coaxial inlet and outlet ends serially slip coupled into these fittings and the R/O drain adapter end closure structure and associated elbow outlet are attached to a side T-inlet of the three-way Tee.

19 Claims, 3 Drawing Sheets

REJECT WATER DRAIN LINE INSTALLATION SYSTEM AND APPARATUS FOR UNDER SINK REVERSE OSMOSIS FILTER SYSTEM

FIELD OF THE INVENTION

The present invention relates generally to dispensing systems for potable water, and more particularly to improvements in drain line installation systems and apparatus for disposing of reject water from an under sink reverse osmosis water filter system into an existing household plumbing system.

BACKGROUND OF THE INVENTION

Reverse osmosis systems (referred to alternatively herein as "R/O" Systems) applied to the purification of water are known in the art. Their use is expanding rapidly for the production of relatively small quantities of potable water for household uses.

Such reverse osmosis systems under normal operating conditions produce a continuous flow of waste water, which may amount to as much as 75% of the input water volume, and which may have a high salt content. This waste water or brine must have a continuous drainage facility for removing this processed water from the reverse osmosis system. In this respect, for the safety of the system and to meet laws and ordinances of towns and municipalities, particularly where such drainage facilities are connected to the sewer system, an adequate anti-syphon means is required to prevent the possibility of sewage or tainted water backing into the R/O System through the drain for the waste water or brine. Generally this is in the form of a one inch or more air gap in the drain line at a point or at a specified height above the valve mounting surface or waste water basin overflow plane for undercounter installation set-ups.

Typically, most kitchen counter single compartment sinks have their sole bottom outlet plumbed directly to the main waste inlet of a conventional garbage disposer unit. Waste water from the sink flows through the garbage disposer and exists horizontally via an outlet plumbing elbow, provided with and attached to the disposer at its lower side, which leads through a 90° bend vertically downwardly into the upper inlet end of a standard plastic or brass tubular plumbing trap. The disposer may also have a dishwasher drain line connected into the upper side thereof that feeds waste water from the dishwasher through the disposer and out of the disposer outlet.

Hitherto, a serious problem has existed with respect to undercounter R/O Systems installations, particularly retrofit installations, with respect to the manner and means for connecting the outlet end of the waste water drain line, downstream of the air gap, to the standard disposer drain plumbing fittings conventionally encountered in most household plumbing systems. Most plumbing codes (and R/O manufacturer's warranties) prohibit the connection of R/O waste water drain line anywhere in the outlet plumbing elbow of the disposer because of the danger of clogging by the relatively high velocity discharge from the disposer when the same is operated in the disposal grinding mode to grind and wash down garbage and similar refuse. Such codes also require the R/O waste water drain line to be connected upstream of a suitable sewer trap. Hence in the case of single compartment, disposer-equipped sinks there may be no alternative for the R/O System installer to run the R/O waste water drain line down through the kitchen floor to a laundry sink standpipe or available basement or cellar floor drain. Of course, this procedure is expensive and time consuming from the labor and material standpoint, and in some instances a suitable connection of this type may not be economically feasible or even available, thereby effectively preventing installation of the R/O System.

Even in those residential kitchen sink installations which are provided with a double compartment sink certain installation problems remain. In such double sink installations one of the sinks or sink compartments carries the garbage disposer, and the other, non-disposer sink, has its waste water outlet connected via standard plumbing fittings, which includes a horizontal outlet run leading into a conventional baffle Tee-fitting connected between the disposer elbow and sink drain trap. This disposer Tee has an interior baffle which operates to divert the downward discharge from the disposer elbow away from and past the Tee-inlet connected to the non-disposer sink plumbing. Plumbing codes permit the R/O waste water drain line connection to enter such non-disposer sink waste plumbing upstream of the disposer baffle Tee because of the isolation provided by its interior baffle. Accordingly, commercially available R/O System installation equipment often includes conventional drain saddle hardware fittings, i.e., split clamp straps, mounting fasteners and an associated drain saddle elbow for making this waste water drain connection to such existing plumbing fittings. However, this requires that a suitable hole be drilled into either the vertical or horizontal run of the non-disposer sink outlet plumbing fittings, and the drain saddle clamp fitting registered and clamped to communicate the elbow with the drilled hole.

Although kitchen double compartment sinks thus can legally accommodate connection of the R/O waste water drain line in the immediate vicinity of the undercounter R/O System installation, some state and local plumbing codes prohibit the use of saddle-type valves and/or drain connections (i.e., Alaska, Delaware, Idaho, Kentucky, Massachusetts, Michigan, Minnesota, New Hampshire, North Dakota, Ohio, Oregon and South Dakota). Hence in such states, even with a double compartment sink plumbing arrangement incorporating a disposer baffle Tee, the R/O waste water drain line outlet again must be run from under the kitchen counter to the basement or some other area having a standpipe or drain arranged to feed into a suitable entry point to the household sewer system, such as the aforementioned laundry sink standpipe or basement floor drain. Such waste water drain line connection problems have seriously impeded or prevented retrofit installations of R/O filter systems in existing dwelling structures, particularly in older residences and in well developed older communities supplied with municipal water, where such R/O water filter systems are particularly needed.

Accordingly, it is an object of the present invention to provide an improved R/O waste water drain line outlet connection system and hardware which overcomes the aforementioned problems in a simple, efficient, reliable and economical manner.

Another object of the present invention is to provide an improved drainage system and fittings for safely and readily coupling the R/O waste water drain line to existing household single sink disposer outlet plumbing in the immediate vicinity of the undercounter R/O filter system installation.

Yet another object of the present invention is to provide a simple and inexpensive plumbing fitting improvement for connecting the waste water drain line to the existing undercounter single or double sink plumbing, whether or not equipped with a garbage disposer, and which is easy to install and highly compatible with existing inexpensive plastic or brass tubular slip joint (S/J) type plumbing fittings of conventional design and standardized, code-approved construction.

A further object of the present invention is provide an improved waste water drain line outlet fitting of the foregoing character which can be either preassembled or readily assembled and disassembled on site with no tools.

BRIEF DESCRIPTION OF THE DRAWINGS

Other objects, features and advantages of the present invention will become apparent from the following detailed description, appended claims and accompanying drawings (which are drawn to scale unless otherwise indicated), in the several figures of which like reference numerals identify like elements, and wherein:

DETAILED OF THE PRESENTLY PREFERRED EMBODIMENTS

First Embodiment Waste Drain System and Coupling

Figure 1:
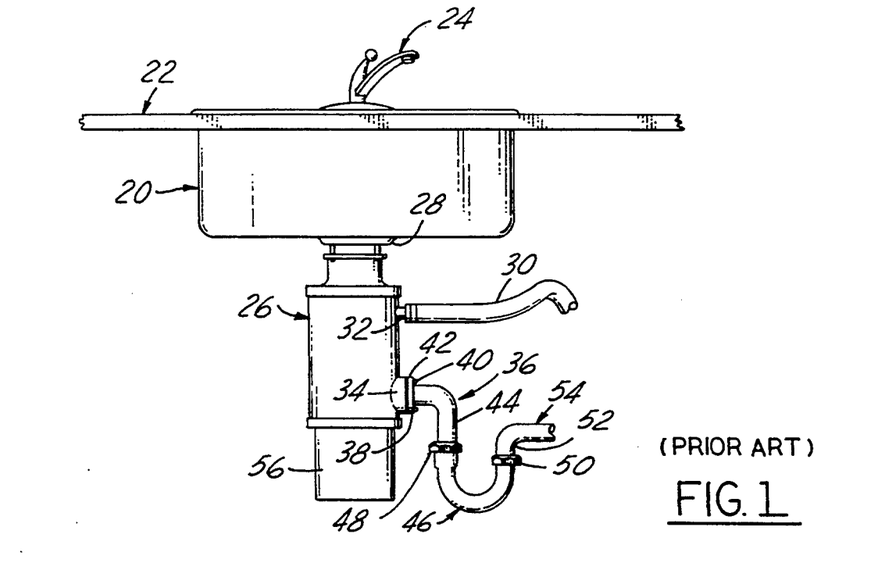
FIG. 1 is a fragmentary elevational view of a typical household single compartment sink kitchen counter installation shown prior to the installation of the R/O filter system improvements of the present invention and having a conventional garbage disposer installed therebeneath, a dishwasher drain line being connected to the disposer upper side inlet and the disposal outlet elbow connected via a conventional trap to a horizontal waste line.

Referring first to FIG. 1, a typical residential kitchen counter single compartment sink installation is illustrated prior to retrofit installation of an R/O system in accordance with the present invention. Such a single sink set-up includes a single compartment sink 20 mounted through a suitable opening in a kitchen counter 22, and an associated conventional water dispensing faucet 24 (herein illustrated as a single lever hot and cold water mixing faucet). A conventional garbage disposer 26 is suspended in the usual manner from sink 20 with its upper main inlet in communication with the single sink waste outlet 28. An under-counter automatic dishwasher unit (not shown) has its dishwater drain line 30 connected to the upper side inlet fitting 32 of disposer 26. The outlet 34 of disposer 26 is coupled to a disposer elbow 36 by a flange clamp 38 and associated mounted bolts 40, the connection being sealed by a disposer drain gasket 42. The vertical run 44 of elbow 36 is typically connected to a conventional sink trap 46 by a slip joint nut 48 and associated slip joint beveled washer (not shown). The outlet end of trap 46 is similarly connected by a slip joint nut 50 to the elbow 52 of a horizontal waste line 54 leading to the main sewer drain of the household. Typically the garbage disposer installation instructions require that the disposer waste line 54 and associated trap 46 be plumbed at the appropriate elevation to prevent standing water in the disposer motor housing 56.

It is to be noted that the single sink/disposer installation of FIG. 1 cannot accept a waste water drain connection from an R/O filter system because there is no place to connect the drain saddle provided with such a system to the disposer waste line. The saddle cannot be connected to the horizontal waste line 54 since it is downstream of trap 46, nor can it be connected to the elbow 36 without voiding the system manufacturer's warranty and violating the laws and plumbing code ordinances (plumbing codes or Uniform Plumbing Code) of substantially all towns and municipalities. Hence the R/O waste water drain line hitherto had to be run through a hole drilled in the kitchen floor to a basement laundry sink standpipe or to closest available basement or cellar floor drain. If such drains were not available or accessible this condition has in most instances forestalled installation of the desired R/O filter system. Moreover, even if such remote drain connections were available, the cost of running the waste water drain line to the same often was uneconomic and/or created maintenance problems due to the excessive length and small diameter of such waste water tubing increasing the risk of clogging.

However in accordance with a principle feature of the present invention, a conventional R/O filter system designed for undercounter installation now can be easily and unexpensively installed in such a single sink/disposer set-up so as to utilize the disposer waste drain line to receive the reject waste water from the R/O system.

Figure 2:
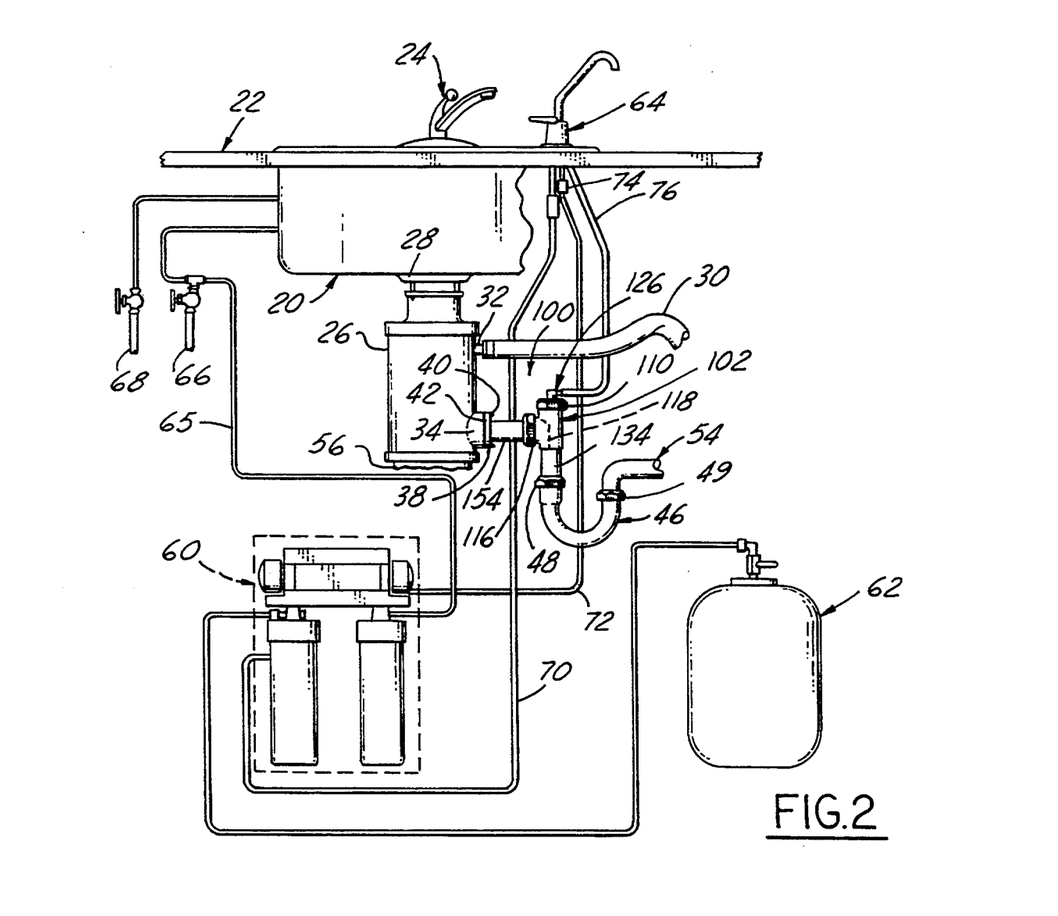
FIG. 2 is a fragmentary vertical elevational view of the single sink and disposer equipment of FIG. 1 after installation of an R/O System incorporating a first embodiment of the waste water outlet coupling system and apparatus of the present invention.

Referring to FIG. 2, the single sink/disposer kitchen counter installation of FIG. 1 is shown in conjunction with the installation of a typical commercially available reverse osmosis drinking water appliance (illustrated diagramatically). Such a commercial residential R/O drinking water appliance preferably is that made by Water Factory Systems (a unit of Commercial Intertech) of Irvine, Calif., Series N4000, N4500 or N5000, and typically includes a purification assembly 60, a storage tank 62, and a filtered water dispensing faucet and air gap module assembly 64. Unfiltered potable water is supplied to the system via a tubing connector 65 connected to the existing cold water supply line 66 which is usually run adjacent to the household hot water supply line 68. Fully filtered product water is delivered from the R/O system via a tubing connector 70 connected to the dispensing faucet assembly 64. The R/O system reject waste water is conducted by a tube 72 leading up to the vertical spout 74 of the air gap assembly included in faucet assembly 64. This R/O waste water is then returned from the air gap assembly via the R/O waste water drain line tubing 76 to a waste water drain coupling 100 provided in accordance with the present invention.

Figure 3:
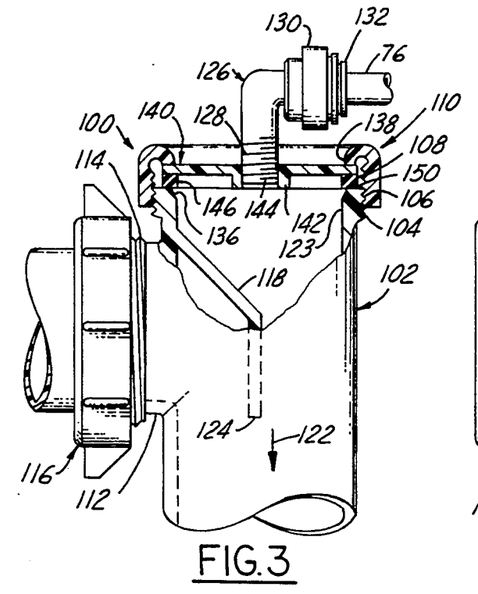
FIG. 3 is an enlarged fragmentary elevational and part center-sectional view of the first embodiment of the waste water coupling improvement of the present invention as utilized in the system of FIG. 2.

As best seen in FIG. 3 in conjunction with FIG. 2, coupling 100 is made up almost entirely of inexpensive, commercially available slip-joint (S/J) type tubular plastic (or brass) plumbing fitting currently mass produced for the household residential as well as commercial market by such companies as Dearborn Brass, Plumbing Wholesale Division of 21st Century Companies, Inc., of Tyler, Tex., and Brass Craft of Southfield, Mich. Thus, the primary component of coupling 100 is a standard commercially available plumbing fitting known as a "baffle Tee" 102 (e.g., Dearborn Plastic Baffle Tee Part No 9185, "1½" End Outlet Slip Joint") Baffle tee 102 is injected molded from polypropolyne material (PP) and has an external flange 104 at its upper end provided with external threads 106 for threadably receiving the internal threads 108 of a standard slip joint nut 110 (e.g., Dearborn Brass Part No. 9001, 1½" "Slip Joint Nut").

Tee 102 has an upper side inlet in the form a tubular projection 112 provided with external threads 114 to threadably receiving a second S/J nut 116 identical to nut 110. Tee 102 is also provided with a standard interior baffle 118 to divert the incoming garbage disposal liquid waste products, entering via inlet 112 into the main throughbore 120 of fitting 102, downwardly in the main flow direction of the fitting as indicated by the flow direction arrow 122 provided on the exterior of the fitting. In the normal use intended for Tee 102, another standard S/J type plumbing fitting, such as a sink tail piece, would have its unflanged, "tail-end" outlet inserted into the upper end inlet portion 123 of bore 120. Baffle 118 is normally intended to also divert incoming liquid flow entering from the outlet of such an associated S/J tubular conduit away from the liquid flow entering via inlet 112, the two input flows merging downstream of the lower end 124 of baffle 118. Such standardized baffle tees are required by the Uniform Plumbing Code when the outlet fitting(s) from the garbage disposer is to be tee-connected in parallel to another sanitary waste line upstream of the trap 46 of the undersink plumbing system.

Coupling 100 also includes a drain elbow such as another standard and readily available part, namely, a drain saddle elbow 126 customarily provided with the commercially available reverse osmosis drinking water appliance equipment. Elbow 126 has an external (male) national pipe thread 128 provided at its outlet nipple end. Fitting 126 preferably is also provided (by the R/O appliance manufacturer) with a "Push-In" connector 130 which includes a push-in catch and release collet 132 and associated O-ring seal (not shown) for quickly and releasably attaching the outlet end of the R/O waste water drain tube 76.

Referring to FIG. 2, Tee 102 also has a reduced diameter sleeve portion 134 designed as a "slip-end" in accordance with industry standards for slip feeding through the S/J nut 48 (and a customarily associated S/J beveled washer) of the trap fitting 46 or other S/J plastic or brass tubular plumbing fittings of the same nominal diameter rating. Tee 102 also has a chamfer 136 (FIG. 3) at its upper inlet end designed to cooperate with a standard slip joint (S/J) beveled polyethylene washer (not shown). Such a S/J beveled washer is adapted to be clamped between the ID lip 138 of S/J nut 110 and chamfer 136 as the nut is threaded downwardly on external threads 106 of Tee 102 to thereby squeeze inner periphery of the washer against the mating tail sleeve of another S/J plumbing, such as the aforementioned sink tail piece, fitting inserted into the upper end of Tee 102. However, such an S/J beveled washer is preferably not used in coupling 100 of the invention when constructed as illustrated in FIG. 3.

In accordance with a principle feature of the first coupling embodiment of the present invention, the foregoing commercially available inexpensive plumbing fittings, namely Tee 102, S/J nut 110 and saddle drain elbow 126, are converted for use in R/O waste water drain coupling 100 by providing in combination therewith only one custom made additional part, namely an adapter part in the form of an elbow fitting closure plate 140 (FIG. 3). Plate 140 in the embodiment of FIG. 3 is preferably in the form of an imperforate thin, flat, circular disc made of a suitable, durable rigid material such as brass or plastic (such as PVC, PP or "Plexiglas" plastic material) having an outside diameter adapted to be received with a close sliding fit within the S/J nut integral threads 108. Plate 140 preferably is also provided with an integral central boss 142 projecting vertically downwardly from the lower (fitting-interior) surface of plate 140 and provided with a through-bore having internal pipe threads 144 for threadably and sealably receiving the male pipe threads 128 of the nipple end of elbow 126. Although boss could project upwardly from the upper surface plate 140, the interior oriention of boss 142 is preferred in order to provide as much vertical clearance space as possible between elbow 126 and waste line 30.

Alternatively, closure plate 140 may constitute a simple flat circular disc (not shown) having an unthreaded center opening for slidably receiving elbow-nipple threads 128 therethrough. Elbow 126 and plate 140 in this alternative are removably secured together by standard hex-nuts (not shown) threaded on threads 128, one above and one below the disc, along with a suitable washer(s) (not shown) for sealing this disc-elbow-subassembly. However, such an alternative is not preferred since it probably would not meet most plumbing codes.

Plate 140 is sealed liquid tight on the upper end of Tee 102 by placing a suitable conventional thin flat rubber washer 146, properly size-rated, between plate 140 and the upper end of Tee 102. Screwing S/J nut 110 downwardly on Tee 102 will squeeze washer 146 between plate 140 and the flat upper end surface 150 of Tee 102. It is to be noted that the standard slip joint beveled washer (not shown, described above) should not be used in place of the flat washer 146 in the construction shown in FIG. 3 because there is no tail sleeve surface present in coupling 100 for it to compress against. Such an S/J beveled washer would also diminish the threaded overlap engagement of nut 110 with threads 106 by more than the thickness of washer 146.

The manner of retrofit installation of the R/O reject water conversion kit of the invention, in the case of a single compartment sink equipped with a disposer, is best seen by comparing the respective "before" and "after" FIGS. 1 and 2. The various components and tubing connections of the commercially available R/O system are installed as described in conjunction with FIG. 2 by following the manufacturer's installation literature instructions, except for the outlet connection of the waste water drain tube 76. The installer then performs the following steps:

1. Remove disposer elbow 36 by first removing bolts 40 and decoupling clamp 38, and then loosen S/J nut 48 so that disposer elbow 36 can be slid upwardly and outward of trap 46.
2. Swing trap 46 away from disposer 26 (loosening its other S/J nut 149, if necessary) to provide additional working clearance, and then insert the tail piece 134 of the disposer Tee 102 through S/J nut 46 into the upper end of trap 46.
3. Utilizing a proper diameter standard sink tail piece 154 (e.g., Dearborn Plastic Part No. 9799, 4 inch; 9800, 6 inch; 9801, 8 inch; or 9803, 12 inch), install a new disposer drain gasket 42 on the flanged end of tail piece 154 by pressing the inside slot of the gasket over the flange, evenly seated, so that the thick end of the gasket 42 faces disposer 26 and the gasket release end faces Tee 102.
4. Temporarily hold the flanged end of tail piece 154 against the disposal drain outlet and the other, slip end adjacent the disposal Tee inlet 112, mark for cut-off length, and then cut the slip end of the tail piece to the appropriate length for insertion into Tee inlet 112.
5. With tail piece 154 so cut to appropriate length, install the flanged end of tail piece 154 onto the disposer outlet 34 using the original mounting clamp 38 and bolts 40.
6. Then swing trap 46 with Tee 102 thereon towards disposer 26 until the Tee inlet 112 telescopically receives the slip end of tail piece 154 and firmly seats thereover.
7. Then tighten the disposal clamp bolts 40 and the S/J nut 116 to firmly clamp and seal tail piece 154, and tighten S/J nut 48 to firmly secure and seal lower slip end 134 of Tee 102 in tap 46. Check and re-tighten S/J nut 49.
8. Next, position washer 146 on the upper end of Tee 102, sub-assemble closure plate 140 and S/J nut 110 as shown in FIG. 3, and then sub-assemble elbow 126 by screwing elbow nipple thread 128 into threads 144 of plate boss 142 until firmly seated (after suitably doping the threads with pipe sealant); then plate closure plate-nut-elbow subassembly 110-126-140 on washer 146 and orient tube 76 in the desired angle or direction (normally toward the faucet assembly 64); and then tighten S/J nut 110 to firmly secure and seal closure 140 on Tee 102.
9. Install outlet end of tube 76 into push-in connector 130 of elbow 126.

With coupling 100 of the invention so installed on the single sink/disposer set-up system of FIG. 2, and assuming the other setup and check out procedure normally associated with the reverse osmosis drinking water appliance equipment has been completed, the system of FIG. 2 is now ready for operation. The reject water from the reverse osmosis filter system will flow via tube 76 down through fitting 126 into the upper end of Tee 102 and then downwardly to trap 46 for disposal into the household sewer system. Normal water drainage from sink 20 as well as garbage disposal refuse forcibly ejected via the outlet of disposer 26 will enter Tee 102 via inlet 112 and be diverted downwardly by the baffle 118. Tee baffle 118 thus ensures functional isolation of the garbage disposer outlet flow from the waste water drain flow. In addition, the position of elbow 126 above disposer outlet 34 by its mounting on the upper end of Tee 102 further isolates the two flows and helps to further prevent contamination of the waste water fitting 126 and tube 76. Coupling 100 of the invention thus is designed to satisfy the Uniform Plumbing Code for waste drain liquid systems arranged in parallel waste flow with disposer 26.

Second Embodiment Coupling

Figure 4:
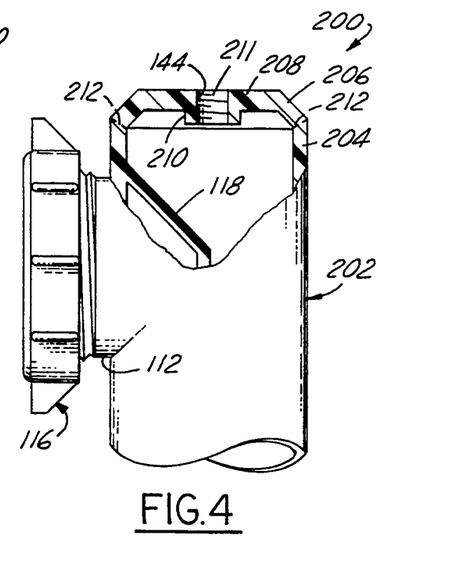
FIG. 4 is a second embodiment of a waste water coupling improvement of the present invention alternately usable in the installation of FIG. 2.

FIG. 4 illustrates a second embodiment coupling 200 of the invention is comprising a modified baffle Tee 202 which may be made identical to Tee 102 except for the upper end structure of the Tee. The upper end adapter of the main cylindrical wall 204 of Tee 202 is joined integrally by a frusto conical wall 206 to a flat, transverse end closure wall 208. A protruding boss 210 is integrally formed centrally of wall 208, preferably, like boss 142, extending downwardly from the interior surface of wall 208. Boss 210 has a through-opening 211 internally threaded with pipe threads 144 to threadably receive the nipple end of drain saddle elbow 126 in the manner of the coupling 100. The modified baffle Tee 202 of coupling 200 thus is a custom-made plumbing fitting intended for use as an alternate to coupling 100 when connecting the R/O waste water drain line 76 to a single compartment sink/disposer installation in the manner of FIGS. 1 and 2. Tee 202 may be readily mass produced initially in two parts from plastic by injection molding one part as the main body of the baffle Tee (with inlet 112 and baffle 118) so that its upper end terminates at a joint line 212, and the closure made as the other part comprising the conical wall 206, end wall 208 and boss 210. These two piece parts are then subsequently permanently joined at joint 212 by any suitable means such as adhesive, ultrasonic welding, etc. Due to the initial molding and assembly tooling costs, modified baffle Tee 202 of coupling 200, if produced in low quantities is more expensive than coupling 100 but is cost effective in high volume because it simplifies somewhat the assembly task of the installer because it eliminates the cost of washer 146 and the S/J nut 110 and their assembly time.

Second Embodiment Waste Drain System and Third Embodiment Coupling

Figures 5, 6, 7:
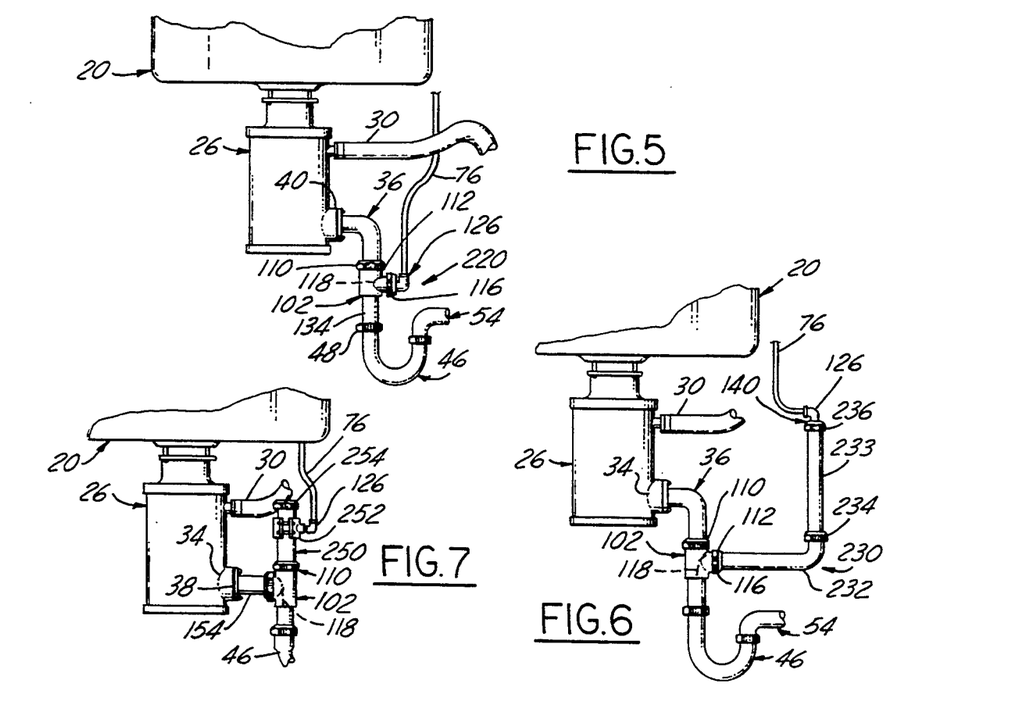
FIG. 5 is a fragmentary elevational view of a second embodiment of the waste water drain system for the single sink/disposer set-up of FIG. 1 utilizing the first embodiment coupling of FIGS. 2 and 3 assembled in an alternate manner for use in the second embodiment system.
FIG. 6 is a third embodiment system employing a third embodiment coupling of the invention applied to the single sink/disposer set-up of FIG. 1.
FIG. 7 is a fourth embodiment connection system employing a fourth embodiment coupling of the invention.

FIG. 5 illustrates a second embodiment of a waste water drain hook-up system and a modified third embodiment coupling 220 which uses the same components as coupling 100 of FIGS. 2 and 3. Coupling 220 is preferably utilized in those installations where trap 46 is or may be positioned at a lower elevation relative to disposer 26 than that illustrated in FIGS. 1 and 2. If this possibility exists in a given under-counter installation set-up, then installation can be further simplified because disposer elbow 36 need not be removed and replaced by tail piece 154 as prescribed in the installation of coupling 100. Instead coupling 220 uses baffle Tee 102 re-connected to receive the lower slip end of elbow 36 through its upper end inlet portion 123, and is secured thereto by S/J nut 110 and an associated S/J beveled washer. The slip end sleeve 134 of Tee 102 is inserted into the upper end of trap 46 and secured therein by tightening S/J nut 48. Then R/O waste water tube 76 and associated saddle drain elbow 126 can be interconnected into the drainage system by utilizing the side inlet 112 of Tee 102 and associated S/J nut 116. The orientation of Tee 102 in coupling 220 is thus rotated 180° relative to disposer from its orientation in coupling 100. However interior baffle 118 still functions to isolate the incoming disposer waste coming down from elbow 36 into Tee 102 from the waste water entering inlet 112 from tube 76 in accordance with the Uniform Plumbing Code. In those situations where trap 46 is disposed at an even lower elevation than that illustrated in FIG. 5 relative to disposer 26, an extension tail piece may be plumbed to Tee slip end 134 and connected to the inlet of trap 46 in accordance with conventional slip joint plumbing fitting practice. In either instance, the installation of coupling 220 is simpler than that of coupling 100 since disposer elbow 36 need not be dismantled and replaced by tail piece 154.

Third Embodiment Waste Drain System and Fourth Embodiment Coupling

FIG. 6 illustrates a third embodiment of a waste water drain installation system for a single compartment sink/disposer set-up for those installations where trap 46 can be disposed at the elevation indicated in FIG. 5 relative to disposer 26. Disposer baffle Tee 102 is assembled to drain 46 and disposer elbow 36 in the same manner as the FIG. 5 installation. However the waste water drain tube 76 outlet is connected at a substantially higher elevation into the waste line by utilizing a fourth embodiment coupling 230 of the invention made up of a standard quarter bend plumbing fitting 232 (e.g., Dearborn Plastic Part No. 9006), and a standard extended tail piece 233 (i.e., having a threaded instead of flanged end; e.g., Dearborn Plastic Part No. 9792). The slip end of fitting 232 is inserted into the S/J nut 116 and side inlet 112 of Tee 102 so as to extend horizontally from Tee 102. The quarter bend portion of fitting 230 is oriented upright to receive the slip end of tail piece 233 and its S/J nut 234 is tightened thereon to support tail piece 233 upright as illustrated in FIG. 6. The upper end of tail piece 233 is provided with slip joint nut 110 and associated closure piece 140, washer 146 and elbow 126 in the same manner as these parts are assembled to the upper end of baffle Tee 102 in FIG. 3.

With the system of FIG. 6 the garbage refuse and waste forcely discharged from disposer outlet elbow 36 is isolated from the R/O waste water drain water by baffle 118 of Tee 102 as well as by the separation and standpipe effect of fittings 232 and 233 to thereby further protect waste water tube 76 from clogging and contamination.

It is also to be understood that such standpipe isolation can be incorporated into the coupling 100 and system of FIG. 2 by inserting a tail piece 232 into the upper end of Tee 102, with elbow 126 and closure plate 140 and washer 146 (as illustrated in FIG. 3) assembled to the tail piece threaded upper end as in FIG. 6, instead of coupling elbow 126 directly to the upper end of fitting 102.

Fourth Embodiment Waste Drain System and Fifth Embodiment Coupling

FIG. 7 illustrates another embodiment of a single compartment sink/garbage disposer R/O waste water drain installation set-up in accordance with the present invention, for use in those jurisdictions which permit the use of saddle-type drain connections under their plumbing codes for connection of waste water drain lines upstream of code approved sink drain traps. The system of FIG. 7 utilizes tail piece 154 connected to the disposer outlet along with a baffle Tee 102 coupled to the upper end of trap 46 in the manner of FIG. 2. However, the upper end of Tee 102 is left open and the slip end of a standard extended tail piece 250 is inserted into the upper end inlet portion 123 of fitting 102 (see FIG. 3) and secured therein in a sealed manner by the S/J nut 110 and associated slip joint bevel washer (described previously, not shown). An appropriate hole is drilled in the side of tail piece 250 near the upper end thereof, and the saddle drain clamp 252, customarily provided with the R/O system appliances is clamped about tail piece 250 with the outlet of the clamp 252 registered with the drilled hole in tail piece 250. The saddle elbow 126 is threaded into the socket of clamp 252 and tube 76 inserted in the push-in coupling 130, provided with elbow 126.

The normally open upper end of tail piece 250 in accordance with the present invention, is closed and sealed liquid and gas tight by providing a modified closure plate (not shown) which, like closure 140, is a thin, flat rigid circular disc made of brass or plexiglas but without the center opening 144 or mounting boss 142 of plate 140. This closure disc plate is mounted between a washer (identical to washer 146 of FIG. 3) and an S/J nut 254 (identical to nut 110) in the manner in which closure plate 140 is mounted on Tee 102 in FIG. 3. The installation of FIG. 7 thus meets the Uniform Plumbing Code insofar as the same is isolated from the disposer discharge by baffle Tee 102, and also provides standpipe vertical isolation by the elevated mounting of elbow 126 relative to the disposer discharge outlet 34. However, as previously indicated, the installation system and coupling of FIG. 7 is not usable in those jurisdictions listed above which prohibit use of saddle drain hardware connections.

Fifth Embodiment Waste Drain System and Sixth Embodiment Coupling

Figures 8, 9:
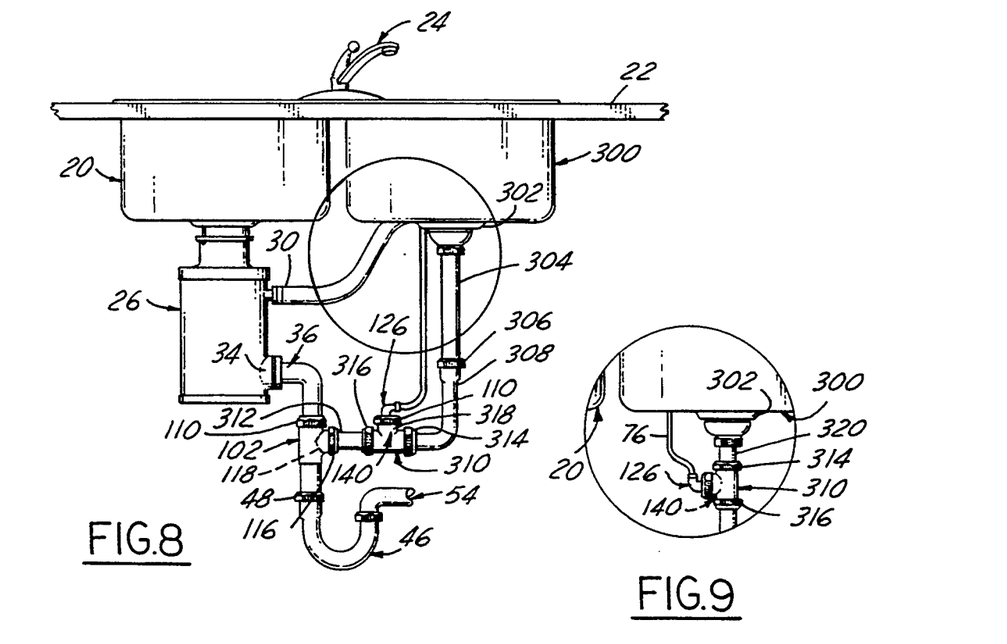
FIG. 8 is a fragmentary elevational view of a double compartment sink kitchen counter set-up with a disposer carried by one sink compartment and the non-disposer sink compartment drain plumbing coupled to the disposer outlet plumbing and having a fifth embodiment coupling of the present invention connected into the non-disposer drain line and serving as the R/O waste water drain connection.
FIG. 9 is a fragmentary elevational view of the circled portion of the set up of FIG. 8 illustrating a sixth embodiment system connection utilizing the coupling of FIG. 8 reoriented for the waste water drain connection.

FIG. 8 illustrates an R/O waste water drain line installation in accordance with the invention applied to a conventional double compartment sink installation wherein a non-disposer sink compartment 300 is mounted in the kitchen counter 22 immediately adjacent the disposer-equipped sink compartment 20. The sole bottom outlet 302 of sink 300 is connected to a waste line comprising a conventional flanged tail piece 304 having its lower slip end inserted through a slip joint nut 306 and into the upper end of a slip joint elbow fitting 308. In accordance with a principal feature of this embodiment of the invention, a sixth embodiment waste water coupling 310 connects the horizontal outlet run of elbow 308 to a standard tail piece 312 (both ends are slip ends) having its slip end coupled by S/J nut 116 to baffle Tee 102. Baffle tee 102 is coupled between the disposer outlet elbow 36 and trap 46 in the manner of system of FIG. 5.

Coupling 310 includes a commercially available, standard slip joint plumbing component, namely a three-way slip joint Tee (e.g., Dearborn Plastic Part No. 9679) oriented with its main through bore horizontal and having S/J nuts (and associated S/J beveled washers) 314 and 316 provided at its inlet and outlet respectively coupling thereto the slip ends of fittings 308 and 312. The side or T-inlet 318 of three-way Tee 310 is provided with the S/J nut 110, washer 146, closure plate 140 and saddle drain elbow 126 coupled thereto in the manner in which these parts are coupled in assembled relation to the upper end inlet of Tee 102 in FIG. 3. Waste water drain tube 76 is likewise coupled to elbow 126 in the manner of FIG. 3. Tube 76 connects to an R/O drinking water appliance system installed in the manner of FIG. 2, but illustrations of these previously described R/O system components is omitted from FIG. 8 for clarity.

The double sink installation of FIG. 8 utilizing coupling 310 represents an inexpensive solution to the problem of coupling the R/O waste water drain line to trap 46 in parallel with both the garbage disposer 26 of sink 20 and the sink waste water drain from non-disposer sink 300 by eliminating a saddle drain clamp coupling, also makes it less expensive and easier to install the R/O waste water drain line to the undersink plumbing components typically found in residential household installations.

Sixth Embodiment Waste Drain System

FIG. 9 illustrates the circled portion of the double sink setup of FIG. 8 with a modified connection system wherein the three-way S/J Tee 310 is re-oriented with its main through-bore vertical and its inlet coupled by S/J nut 314 to the slip end of a short tail piece 320 in turn connected at its upper flange end to the waste outlet plumbing 302 of sink 300. The outlet of fitting 310 is coupled by its S/J nut 316 to the slip end of a standard plumbing fitting 322 which in turn is coupled in a conventional manner through a horizontal run (not shown) to baffle Tee 102 connected as shown in FIG. 8. Hence the modified installation of FIG. 9 likewise meets all applicable plumbing codes for a double sink installation by avoiding the use of a saddle drain clamp for coupling the waste water tube 76 non-disposer sink of a single or to the double sink drain system.

Seventh Embodiment Coupling

Figure 10:
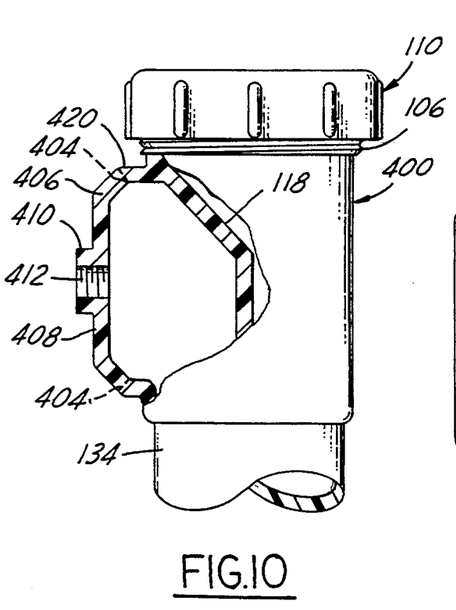
FIG. 10 is a sixth embodiment coupling alternating usable in the system of FIG. 5.

Referring to FIG. 10, a modified, custom-made baffle Tee fitting 400 is illustrated fragmentarily and with portions broken away to illustrate detail. Fitting 400 is intended as an alternate to coupling 220 for use with the R/O waste water drain installation system of FIG. 5 and is similar to baffle Tee 102 in having S/J nut 110 (and associated S/J beveled washer) threadably received on its upper inlet end threads 106. Baffle Tee 400 likewise has the standard slip fit extension 134 and interior baffle 118 of Tee 102. However the inlet to Tee 400 is modified from Tee 102 in a manner similar to the modified upper inlet of fitting 202 of FIG. 4. Thus the side or T-inlet of baffle Tee 400 comprises a cylindrical wall protrusion 402 integrally joined at joint line 404 to end closure structure comprising a conical wall portion 406 and an integral flat circular end wall portion 408.

An outward protrusion or boss 410 is provided centrally of end wall portion 408 and has an internally threaded through opening 412 adapted to threadably receive the nipple threads 128 of drain saddle elbow 126.

Modified fitting 400 is installed in place of and oriented the same as fitting 102 in FIG. 5. Elbow 126 is similarly threadably coupled to opening 412 of the side inlet of fitting 400. Although fitting 400, like fitting 202, is initially more costly to manufacture because it is a custom fitting versus a coupling utilizing a standard commercially available universal fitting component, if economies of scale or volume are achievable fitting 401 could become cost competitive with fitting 102, and has the advantage of reducing installation labor time and attendant costs. Although conventional injection molding techniques would suggest that the end closure piece 406-412 be made initially as a separate part and permanently joined at joint 404 to inlet 402 by suitable means such as adhesive or ultrasonic welding, it is also possible, of course, to make fitting 400 (as well as fitting 202) as a one piece part by using conventional "lost wax" type investment casting techniques.

Eighth Embodiment Coupling

Figure 11:
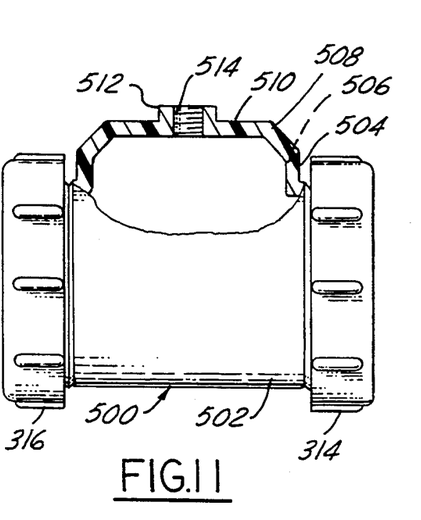
FIG. 11 is a seventh embodiment coupling alternating usable in the systems of FIGS. 8 and 9.

FIG. 11 illustrates a modified custom-made three way Tee 500 intended as a substitute for the three way coupling 310 of FIGS. 8 and 9 in the double sink installation illustrated therein. Three way Tee 500 of FIG. 11 thus has the same main body portion 502 of coupling 310 as well as the associated S/J nuts (and washers) 314 and 316 respectively provided at its inlet and outlet ends. However, in a manner similar to fittings 202 and 400, the structure for coupling the saddle drain elbow 126 into Tee 500 is provided by a cylindrical wall protrusion 504 joined at a circular joint 506 to a conical wall portion 508 in turn integrally joined to flat end wall portion 510. A central boss protrusion 512 of wall 510 has a pipe-threaded through-opening 514 adapted to threadably receive the nipple threads 128 of elbow 126. Modified fitting 500 is thus substituted for and installed in the same manner as fitting 310 in the installation system of FIGS. 8 and 9 respectively. The manufacturing and installation economics of fittings 202 and 400 thus likewise apply to fitting 500.

From the foregoing description it will now be readily understood by those skilled in the art that the reverse osmosis waste water drain installation system and coupling of the present invention in various embodiments overcome the several problems discussed previously in a reliable, simple, economic and safe manner. The system and coupling embodiments of the present invention now enable rejector waste water drain line of the conventional commercially available reverse osmosis drinking water appliances to be quickly and easily installed in single sink/disposer under-counter household installations, whether existing or newly installed, while satisfying the Uniform Plumbing Code criteris for such waste water hook-ups, as well as complying with manufacturers warranties. The various coupling embodiments and system hook-ups of the invention offer great flexibility in connecting to the various plumbing hook-ups encountered with double sink installations, i.e., a disposer sink 20 and non-disposer sink 300 installed side by side as in FIG. 8. It will also be understood that (e.g., if economically justified by high volume demand for mass production) the integral molded end wall construction of modified couplings 200, 400 and 500 can be substituted for plate 140 at the upper end of tail piece 233 to thereby likewise provide a modified custom tail piece in FIG. 6 for use in place of tail piece 233. Similarly, an integrally molded closure plate can be substituted for the imperforate separate closure plate at the upper end of a custom made tail piece for use in place of tail piece 250 in FIG. 7.

Additional combinations utilizing further variations in the couplings and system hook-ups illustrated and described hereinabove will also become apparent from the foregoing disclosure by those skilled in the art to meet the wide variety of under-counter installation problems encountered in the field due to additional water consuming appliances also being installed under-counter in the vicinity of the sink.

It is also to be understood that, although the foregoing description and drawings describe and illustrate in detail various referred embodiments of the present invention, to those skilled in the art to which the present invention relates the present disclosure will suggest many modifications and constructions as well as widely differing embodiments and applications without thereby departing from the spirit and scope of the invention. The present invention, therefore is intended to be limited only by the scope of the appended claims and the applicable prior art.

I claim:

1. In a household under-counter reverse osmosis (R/O) water filtration installation associated with an in-counter sink having a garbage disposer suspended therefrom and in drainage communication therewith, the garbage disposer having an outlet-connected by standard slip fit plumbing fittings to a sink drain trap plumbed to the household sewer system, and in which the R/O installation includes a reverse osmosis reject waste water by-pass conduit means operable for flushing the R/O waste water into an under-counter waste water drain line, the improvement in combination therewith of a waste water drainage system for coupling the waste water drain line into the sink drain trap in parallel drainage relation with the disposer outlet plumbing fittings, said improvement comprising:

a baffle Tee plumbing fitting having first and second inlets oriented with their respective flow axes generally perpendicular to one another and having their input flow initially separated by an internal baffle, said baffle Tee fitting having a common slip outlet communicating with said Tee inlets downstream of said baffle and oriented with its flow axis generally parallel to one of said inlets, a standard slip fit single conduit plumbing fitting having an inlet end and an outlet slip end with said inlet end coupled to the garbage disposer outlet and said outlet end slip coupled to the baffle Tee first inlet via an associated slip joint nut and washer of said first Tee inlet, said baffle Tee outlet being slip coupled to an inlet of said sink drain trap via an associated slip joint nut and washer of said drain trap inlet, and R/O waste water conduit means coupled to said baffle Tee second inlet and to said waste water drain line, said R/O waste water conduit means comprising a R/O drain adapter means provided with an elbow having an inlet serially connected to said waste water drain line, plumbing fitting coupling means connecting an outlet of said elbow with said Tee second inlet, and end closure means operably associated with said elbow and said coupling means sealably closing said second inlet of said baffle Tee to thereby provide a sealed R/O waste water drain passageway from said R/O waste water drain line into said Tee second inlet via said elbow and end closure means.

2. The combination set forth in claim 1 wherein said R/O waste water conduit end closure means is directly attached to said baffle Tee second inlet for sealably closing the same and has means forming a threaded through-opening therein, said drain elbow having a threaded nipple outlet end threadably received in said closure means threaded through-opening.

3. The combination set forth in claim 2 wherein said end closure means comprises a washer seated on said second inlet of said baffle Tee, a circular disc seated on said washer, and said coupling means comprises a slip joint nut having internal threads threadably received on said baffle Tee second inlet and clamping said disc and washer sealably thereagainst.

4. The combination set forth in claim 3 wherein said circular disc is received with a slight clearance fit within said internal threads of said slip joint nut, and said means forming said threaded through-opening comprises a central boss provided on said disc and having an internally threaded through-opening coaxial with said disc.

5. The combination set forth in claim 3 wherein said means forming said threaded through-opening of said end closure means comprises a central opening said disc, said threaded nipple outlet end of said saddle drain elbow extending through aid disc center opening and a pair of nuts threadably received on said threaded nipple, one on either side of the disc and associated seal washer means between at least one of said nuts and said disc.

6. The combination set forth in claim 2 wherein said end closure means comprises end wall means permanently affixed to said Tee second inlet and having an integral central boss with internal threads threadably receiving said threaded nipple outlet end of said saddle drain elbow.

7. The combination set forth in claim 1 wherein said plumbing fitting coupling means comprises a standard flanged end tail piece plumbing fitting having its slio end inserted into said Tee second inlet and coupled thereto by a slip joint nut and associated washer mounted on said Tee second inlet, the axis of the said Tee second inlet and said Tee outlet being coaxial and extending vertically such that said tail piece extends upwardly from said baffle Tee, an imperforate closure plate seated on the upper end of said tail piece, and an S/J nut and associated washer sealably clamping said closure plate sealably across said upper end of said tail piece, a saddle clamp fitting surrounding and engaging said tail piece in the vicinity of said closure plate and having a conduit registering with an opening cut in the side wall of said tail piece, said drain elbow comprising a saddle drain elbow threadably coupled to said saddle drain clamp fitting for communicating said drain line into said tail piece above said baffle Tee.

8. The combination set forth in claim 1 wherein said plumbing fitting coupling comprises standard slip joint plumbing double ended fittings having a slip portion at an outlet slip coupled to said baffle Tee second inlet via a slid joint nut and associated washer, said fittings having a vertical run extending above the elevation of said baffle Tee and having an inlet and with a S/J nut and associated washer thereon, said end closure means comprising a circular disc seated on said washer and clamped thereagainst by said slip joint nut and including means forming a threaded through opening therein, said drain elbow having a threaded nipple outlet end threadably received in said closure means through-opening.

9. The combination set forth in claim 8 wherein said circular disc has a slight clearance fit in its outer periphery with the internal threads of said slip joint nut, and said means forming said threaded through-opening of said closure means comprises a central boss provided on said disc and having an internally threaded through-opening coaxial with said disc.

10. The combination set forth in claim 1 wherein said waste water drainage system includes a second in-counter sink mounted adjacent said first mentioned sink and having a main drain at the bottom thereof without a garbage disposer connected thereto, a series of slip joint standard plumbing fitting conduits connecting said second sink means drain outlet to said baffle Tee second inlet, and a three-way Tee having coaxial inlet and outlet ends serially slip coupled into said standard plumbing fittings and having a side T-inlet oriented perpendicular to said ends, said end closure means being attached to said side T-inlet of said three-way Tee for sealably closing the same and having a through-opening therein, said drain elbow having an outlet draining through said through-opening of said end closure means.

11. The combination set forth in claim 10 wherein said end closure means comprises a circular disc having a center opening, said means forming said through-opening of said closure means comprises a central boss provided on said disc and having a through-opening coaxial with said disc.

12. The combination set forth in claim 10 wherein said end closure means and said coupling means comprises end wall means permanently affixed to said three-way Tee side T-inlet and having an integral central boss with internal threads threadably receiving a threaded nipple outlet end of said drain elbow.

13. A reverse osmosis waste water drain line coupling adapted for use between an outlet end of a waste water drain line tube of a R/O water filtration installation, the outlet of a household garbage disposer attached to an in-counter household sink and a sink drain trap plumbed to a household sewer system, said coupling comprising a baffle Tee fitting with first and second normally open inlets arranged with their respective flow axes generally transverse to one another and having an interior baffle for separating the incoming flows from said inlets, said baffle Tee having a tail piece slip portion forming a common outlet of the baffle Tee downstream of the interior baffle thereof, said Tee first inlet having an S/J nut and associated seal washer thereon adapted for slip joint receiving a slip end of a tail piece of a standard plumbing fitting adapted to be coupled to the disposer outlet, said Tee second inlet having adapter end closure means with a through-opening therein and a drain elbow having an outlet end draining through said through-opening of said end closure means and having an inlet end provided with a push-in connector including a push-in catch and release collet and associated O-ring seal adapted to be push-in coupled to the outlet end of said waste water drain line tube.

14. The coupling as set forth in claim 13 wherein said end closure means comprises a circular member having a slight clearance fit within the internal threads of said slip joint nut and having an unthreaded center opening, said means forming said through-opening of said closure means comprising a central boss provided on said circular member and having a through-opening coaxial with said center opening of said circular member, the axis of said push-in connector being oriented transverse to the axis of said opening of said circular member.

15. The coupling as set forth in claim 13 wherein said end closure means comprises end wall means permanently affixed to said Tee second inlet and having an integral central boss with internal threads threadably receiving a threaded nipple outlet end of said drain elbow.

16. A reverse osmosis waste water drain coupling adapted for use with drain plumbing fittings coupling a non-disposer sink of a double sink in-counter installation to a first inlet of a baffle Tee having a second inlet coupled to a garbage disposer outlet and an outlet coupled to a sink drain trap associated with a disposer sink of the double sink installation, said coupling comprising a three-way Tee having coaxial inlet and outlet ends adapted for serial flow slip coupling into said non-disposer sink plumbing fittings, said three-way Tee having a side T-inlet oriented perpendicular to said ends, and end closure means attached to said side T-inlet for sealably closing the same and having a threaded through-opening therein, and a drain elbow having a threaded nipple outlet end threadably received in said threaded through-opening of said end closure means and having an inlet end adapted to be coupled to an outlet of an R/O waste water drain line.

17. A reverse osmosis waste water drain adapter coupling adapted for use with standard drain plumbing fittings coupling a non-disposer sink directly to an associated sink drain trap or in parallel flow relation in a double sink in-counter installation to a first inlet of a baffle Tee having a second inlet coupled to a garbage disposer outlet and an outlet coupled to a sink drain trap associated with a disposer sink of the double sink installation;

said coupling comprising a three-way Tee having coaxial inlet and outlet ends adapted for serial flow slip coupling into said non-disposer sink plumbing fittings, said three-way Tee having a side T-inlet oriented perpendicular to said ends, and end closure adapter means attached to said side T-inlet for sealably closing the same, said side T-inlet having external threads encircling a through-opening therein and an S/J nut removably threadably received on said external threads and an associated annular seal removably received in said side T-inlet through-opening for removably sealably clamping said end closure adapter means on said side T-inlet, said adapter means including a drain elbow having an outlet end forming part of said through-opening of said end closure means and having an inlet end provided with a push-in connector adapted to be slip-coupled to an outlet of an R/O waste water drain line tube.

18. In a household under-counter reverse osmosis (R/O) water filtration installation associated with an in-counter double sink installation having first and second sinks and a garbage disposer suspended from said first sink and in drainage communication therewith, the garbage disposer having an outlet connected by standard slip fit (S/J) plumbing fittings to a sink drain trap plumbed to the household sewer system, said second in-counter sink being mounted adjacent said first sink and having a main drain outlet at the bottom thereof without a garbage disposer connected thereto, and in which the R/O installation includes a reverse osmosis reject waste water by-pass conduit means operable for flushing the R/O waste water into an under-counter waste water drain line, the improvement in combination therewith of a waste water drainage system for coupling the waste water drain line into the sink drain trap in parallel drainage relation with the disposer outlet plumbing fittings, said improvement comprising:

a baffle Tee plumbing fitting having first and second inlets oriented with their respective flow axes generally perpendicular to one another and having their input flow initially separated by an internal baffle, said baffle Tee fitting having a common slip outlet communicating with said Tee inlets downstream of said baffle and oriented with its flow axis generally parallel to one of said inlets, said baffle tee outlet being slip coupled to an inlet of said sink drain trap via an associated slid joint nut and washer of said drain trap inlet, a standard slip fit single conduit plumbing fitting having an inlet end and an outlet slip end with said inlet end coupled to the garbage disposer outlet and said outlet end slip coupled to said baffle Tee first inlet via an associated slip joint nut and washer of said one Tee inlet, a series of slip joint standard plumbing fitting conduits connecting said second sink drain outlet to said baffle Tee second inlet, and a three-way Tee having coaxial inlet and outlet ends serially slip coupled into said standard plumbing fittings and having a side T-inlet oriented perpendicular to said ends, and R/O waste water conduit means coupled to said three-way Tee second inlet and to said waste water drain line, said R/O waste water conduit means comprising a R/O drain elbow having an inlet serially connected to said waste water drain line, plumbing fitting coupling means connecting an outlet of said elbow with said three-way Tee side inlet, and end closure means comprising a closure member operably associated with said elbow and said coupling means and sealably closing a normally open inlet of said plumbing fitting coupling means, said plumbing fitting coupling means including external threads on said side T-inlet of said three-way Tee, an associated S/J nut threadably received thereon and an annular seal removably attached to said side T-inlet of said three-way Tee for sealably engaging said end closure member when compressed by tightening of said S/J nut on said external threads, said end closure member having a means forming a through-opening therein, said drain elbow forming part of said adapter and having an outlet draining through said through-opening of said closure member adapter and having an inlet oriented with its axis transverse to the axis of said side T-inlet.

19. A reverse osmosis waste water drain line coupling adapter for use between drain outlet plumbing of an in-counter sink and a sink drain trap plumbed to the household sewer system by standard slip-joint (S/J) plumbing fittings, said coupling comprising a standard S/J three-way Tee fitting with first and second normally open inlets arranged with their respective flow axes generally transverse to one another, said Tee having a portion forming a common outlet of the Tee downstream of the inlets thereof for drain communication with said trap, said Tee first inlet having external threads and an internal seat with a first S/J nut and an associated first annular seal respectively removably mounted thereon and adapted for slip joint receiving the slip end of a standard S/J plumbing fitting adapted to be coupled to the sink plumbing outlet, said Tee second inlet also having external threads and an internal annular seat with a second S/J nut and an associated second annular seal respectively removably mounted thereon and adapted for slip joint receiving the slip end of a standard S/J plumbing fitting;

said adapter comprising removable end closure means for said second Tee inlet, said adapter being constructed and arranged to have a circular peripheral wall portion adapted when in assembly with said second Tee inlet with said circular peripheral wall portion and said seal juxtaposed with an internal annular flange of said second S/J nut and said internal seat such that threadably tightening of said second S/J nut on said external threads of said second Tee inlet sealably squeezes and clamps together said adapter peripheral wall portion and said annular seal by compression between said nut internal flange and said second Tee inlet internal seat, said adapter also having an elbow portion with an outlet in said wall portion and an inlet provided with a push-in connector adapted for push-in sealably slip receiving and retaining an outlet end of an R/O waste-water drain line tube, said wall and elbow portions of said adapter together forming a removable liquid-tight closure for said second Tee inlet having a through-passageway adapted for draining R/O waste-water from the outlet end of the R/O drain tube into the interior of the three-way Tee via said second Tee inlet.

* * * * *